(12) United States Patent
Bouchet et al.

(10) Patent No.: US 10,647,440 B2
(45) Date of Patent: May 12, 2020

(54) ASSEMBLY FOR AN AIRCRAFT COMPRISING AN ENGINE OF THE "OPEN ROTOR PULLER" TYPE AND MEANS FOR ATTACHING THE LATTER TO THE RIGID STRUCTURE OF AN ATTACHMENT PYLON

(71) Applicant: Airbus Operations SAS, Toulouse (FR)

(72) Inventors: Eric Bouchet, Aussonne (FR); Jérôme Colmagro, Toulouse (FR); Rohan Nanda, Toulouse (FR); Misael Hernandez Perez, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 318 days.

(21) Appl. No.: 15/823,890

(22) Filed: Nov. 28, 2017

(65) Prior Publication Data

US 2018/0148186 A1 May 31, 2018

(30) Foreign Application Priority Data

Nov. 29, 2016 (FR) ..................................... 16 61659

(51) Int. Cl.
*B64D 27/20* (2006.01)
*B64D 27/26* (2006.01)

(52) U.S. Cl.
CPC ............. *B64D 27/26* (2013.01); *B64D 27/20* (2013.01); *B64D 2027/268* (2013.01)

(58) Field of Classification Search
CPC ........ B64D 27/26; B64D 27/18; B64D 27/10; B64D 27/14; B64D 27/12; B64D 27/20;
(Continued)

(56) References Cited

U.S. PATENT DOCUMENTS 2,633,312 A 3/1953 Hagger
3,809,340 A * 5/1974 Dolgy .................... B64D 27/20
244/54
(Continued)

FOREIGN PATENT DOCUMENTS

DE 2300125 7/1974
FR 2970700 A1 * 7/2012 ............. B64D 27/26
FR 3015433 6/2015

OTHER PUBLICATIONS

French Search Report, dated May 8, 2017 priority document.

*Primary Examiner* — Philip J Bonzell
(74) *Attorney, Agent, or Firm* — Greer, Burns & Crain, Ltd.

(57) ABSTRACT

To allow the attachment of an engine of the "Open Rotor Puller" type to the rigid structure of an attachment pylon, an attachment structure comprises a first attachment structure shifted forwards with respect to the center of gravity of the engine and connected to the rigid structure through a pyramid, a second attachment structure laid out at the rear with respect to the first attachment structure and extending in a plane of a first stringer of the rigid structure, and a third attachment structure laid out at the rear with respect to the second attachment structure. The second attachment structure comprises two engine attachments for recovering the moment along the axis of the engine, laid out on either side of a horizontal symmetry plane of the engine.

11 Claims, 6 Drawing Sheets

(58) Field of Classification Search
CPC ........ B64D 2027/262; B64D 2027/264; B64D 2027/266; B64D 2027/268
See application file for complete search history.

(56) References Cited

U.S. PATENT DOCUMENTS

| | | | | | |
|---|---|---|---|---|---|
| 3,848,832 | A | * | 11/1974 | Stanley | B64D 27/18 244/54 |
| 4,821,980 | A | * | 4/1989 | Clausen | B64D 27/14 244/54 |
| 6,126,110 | A | * | 10/2000 | Seaquist | B64D 27/18 244/54 |
| 8,651,416 | B2 | * | 2/2014 | Journade | B64D 27/18 244/54 |
| 2012/0091265 | A1 | * | 4/2012 | Stretton | B64D 27/12 244/54 |
| 2014/0064950 | A1 | * | 3/2014 | Brochard | F01D 25/24 415/208.1 |
| 2014/0130512 | A1 | * | 5/2014 | Chouard | B64D 27/14 60/797 |
| 2015/0259074 | A1 | * | 9/2015 | Guillemaut | B64D 27/20 244/54 |

* cited by examiner

ASSEMBLY FOR AN AIRCRAFT COMPRISING AN ENGINE OF THE "OPEN ROTOR PULLER" TYPE AND MEANS FOR ATTACHING THE LATTER TO THE RIGID STRUCTURE OF AN ATTACHMENT PYLON

CROSS-REFERENCES TO RELATED APPLICATIONS

This application claims the benefit of the French patent application No. 1661659 filed on Nov. 29, 2016, the entire disclosures of which are incorporated herein by way of reference.

TECHNICAL FIELD

The present invention relates to the field of aircraft and relates more particularly to the attaching of an engine to a part of an aircraft airframe such as an aircraft fuselage tail section, the engine being of the "open rotor puller" type, namely comprising a gas generator and a receiver with a pair of contrarotating unducted rotors positioned forward of the gas generator.

BACKGROUND OF THE INVENTION

There are a certain number of known approaches for supporting conventional aircraft engines mounted beneath the wings or at the tail section of the fuselage. Techniques have also been developed for supporting engines of the "open rotor pusher" type, namely those comprising a gas generator and a receiver having a pair of contrarotating unducted rotors positioned to the rear of the gas generator.

However, in the case of engines of the "open rotor puller" type, in which the pair of unducted contrarotating rotors is positioned forward of the gas generator, the techniques applied to conventional engines or to engines of the "open rotor pusher" type are not suitable.

Specifically, engines of the "open rotor puller" type have their pair of rotors forward of the pylon connecting the engine to the aircraft airframe. As a result, it is necessary to provide a relatively large distance between the rotors and the leading edge of the pylon in order to avoid detrimental aerodynamic interactions between the air propelled by the rotors and the pylon. This distance is typically at minimum of the order of 1 meter.

This constraint dictates that the center of gravity of such an engine be shifted a long way forward with respect to the pylon, thereby requiring a novel approach in terms of how the engine forces are reacted by the pylon.

SUMMARY OF THE INVENTION

It is a particular objective of the invention to afford a simple, economical and effective solution to this problem.

To this end, the invention proposes an assembly for an aircraft, comprising:
  a part of an aircraft airframe,
  an engine comprising a gas generator and a receiver with a pair of contrarotating unducted rotors positioned forward of the gas generator and centered along an axis of the engine,
  an attachment pylon comprising a rigid structure in the form of a box section which has a proximal end connected to the aircraft airframe part and a distal end laterally separated from the proximal end,
  attachment means for attaching the engine to the attachment pylon,
in which:
  the rigid structure comprises a rear closure stringer and a first stringer set out forward of the rear closure stringer,
  the engine has a center of gravity shifted forward with respect to the rigid structure,
  the attachment means comprise first attachment means shifted forward with respect to the center of gravity, second attachment means laid out to the rear with respect to the first attachment means and extending in a plane of the first stringer, and third attachment means laid out to the rear with respect to the second attachment means,
  the attachment pylon comprises a pyramid connecting the first attachment means to the rigid structure,
  the second attachment means comprise two engine attachments for reacting moment about the engine axis, which are positioned one on each side of a horizontal plane of symmetry of the engine.

The overall configuration of the attachment means, particularly the respective positions of the first attachment means, of the second attachment means and of the third attachment means, allows effective transmission of engine forces to the rigid structure of the attachment pylon while at the same time allowing the center of gravity of the engine to be shifted significantly forward of this rigid structure.

The position of the engine attachments that react moment about the engine axis in particular allows this moment to be transmitted directly to the rigid structure and thus makes it possible to limit the load that the pyramid has to bear.

In one preferred embodiment of the invention, the first attachment means comprise two engine attachments for reacting thrust forces which are laid out diametrically opposite one another about the axis of the engine and symmetrically with respect to the horizontal plane of symmetry of the engine.

Furthermore, the first attachment means advantageously comprise two first engine attachments for reacting forces in vertical and transverse directions of the engine, these being arranged one on each side of the horizontal plane of symmetry of the engine.

For preference, the first attachment means comprise a first frame borne by the pyramid and bearing each engine attachment of the first attachment means.

Furthermore, the second attachment means advantageously comprise a second frame borne by the distal end of the rigid structure and bearing the two engine attachments for reacting moment about the axis of the engine.

In the preferred embodiment of the invention, the attachment means comprise two first bars respectively connecting two first regions of the first frame, to which the two engine attachments that react thrust forces are respectively connected, to two second regions of the second frame.

For preference, the attachment means comprise two second bars respectively connecting the two first regions to two third regions of the second frame and arranged between the two second regions in a continuation of the first stringer.

In addition, the attachment means advantageously comprise two third bars respectively connecting the two second regions of the second frame to the third attachment means.

In the preferred embodiment of the invention, the rigid structure comprises an intermediate stringer arranged between the rear closure stringer and the first stringer, and the attachment means comprise two fourth bars respectively connecting the two second regions of the second frame to a region of the distal end of the rigid structure arranged in the continuation of the intermediate stringer.

Moreover, the third attachment means advantageously comprise two second engine attachments for reacting forces in vertical and transverse directions of the engine, these being arranged one on each side of the horizontal plane of symmetry of the engine.

BRIEF DESCRIPTION OF THE DRAWINGS

The invention will be better understood, and further details, advantages and features thereof will become apparent from reading the following description given by way of nonlimiting example and with reference to the attached drawings in which.

Throughout all these figures, identical references may denote elements that are identical or analogous.

DETAILED DESCRIPTION OF THE PREFERRED EMBODIMENTS

Figure 1:
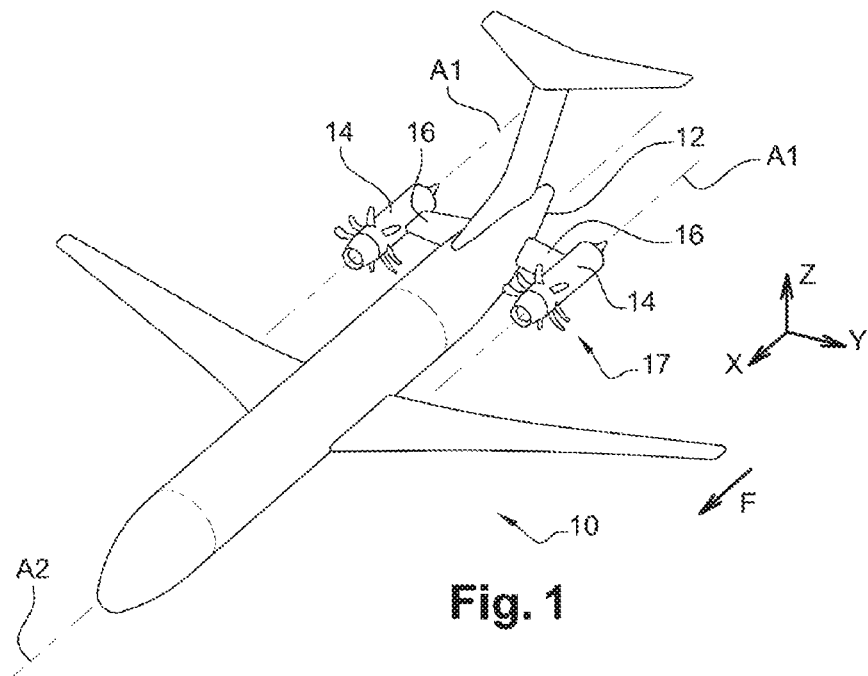
FIG. 1 is a schematic perspective view of an aircraft comprising an assembly for an aircraft according to one preferred embodiment of the invention.

FIG. 1 illustrates an aircraft 10, the airframe of which comprises a part 12, for example a fuselage tail section part, to which two engines 14 are connected via respective attachment pylons 16 extending laterally from the airframe part 12.

The aircraft airframe part 12, the engines 14, and the means connecting the engines 14 to the airframe part 12, constitute an assembly for an aircraft 17 within the terminology of the invention.

In the present description, by convention, the direction X corresponds to the longitudinal direction of each engine 14. This direction X is parallel to a longitudinal axis A1 of each engine 14 and to a longitudinal axis A2 of the aircraft 10, and therefore forms a longitudinal direction of the assembly for an aircraft 17 according to the invention. Furthermore, the direction Y corresponds to the direction oriented transversally or laterally with respect to the aircraft 10 and can also be likened to the transverse direction of the assembly for an aircraft 17 and of each engine 14, whereas the Z direction corresponds to the vertical or height direction. These three directions X, Y and Z are mutually orthogonal and form a direct tetrahedron.

Furthermore, the terms "forward" and "rear" are to be considered with respect to a direction of forward travel of the aircraft (10) moved by the thrust exerted by the engines 14, this direction being indicated schematically by the arrow F.

The engines 14 are of the "open rotor puller" type, namely comprising a gas generator 14A and a receiver 14B with a pair of contrarotating unducted rotors positioned forward of the gas generator 14A and centered along the axis A1 of the engine.

Figure 2:
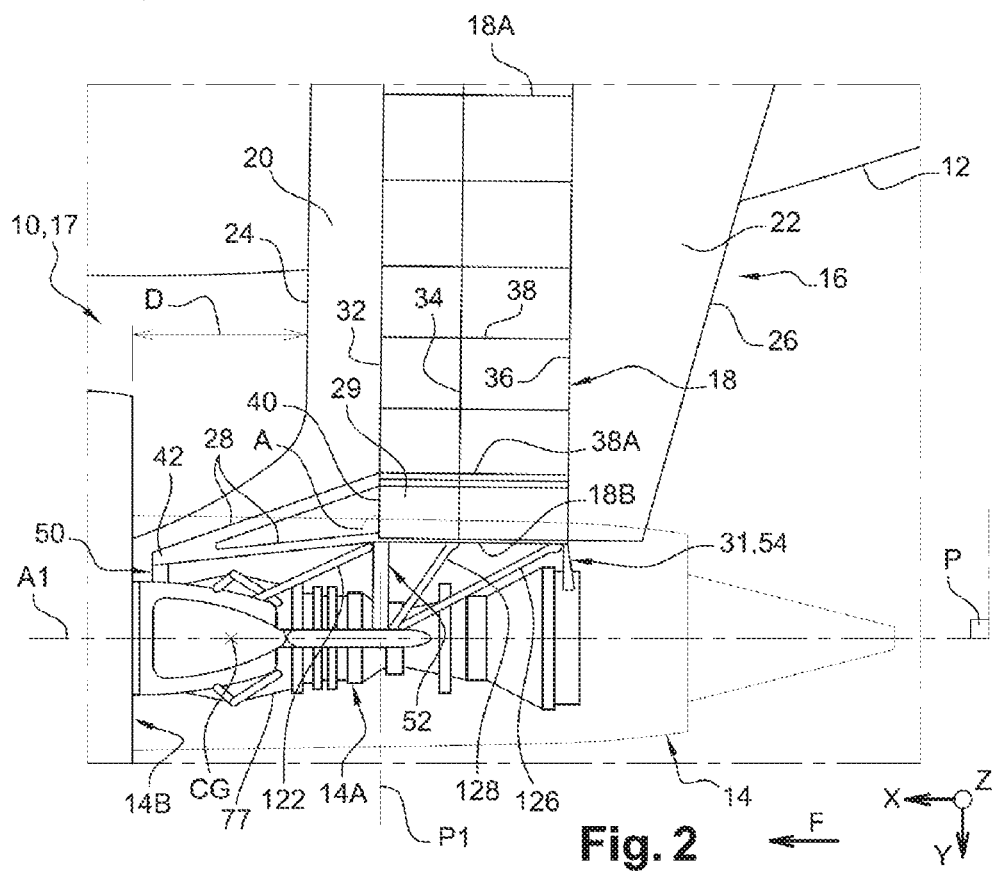
FIG. 2 is a partial schematic view from above of the assembly for an aircraft of FIG. 1.
Figure 3:
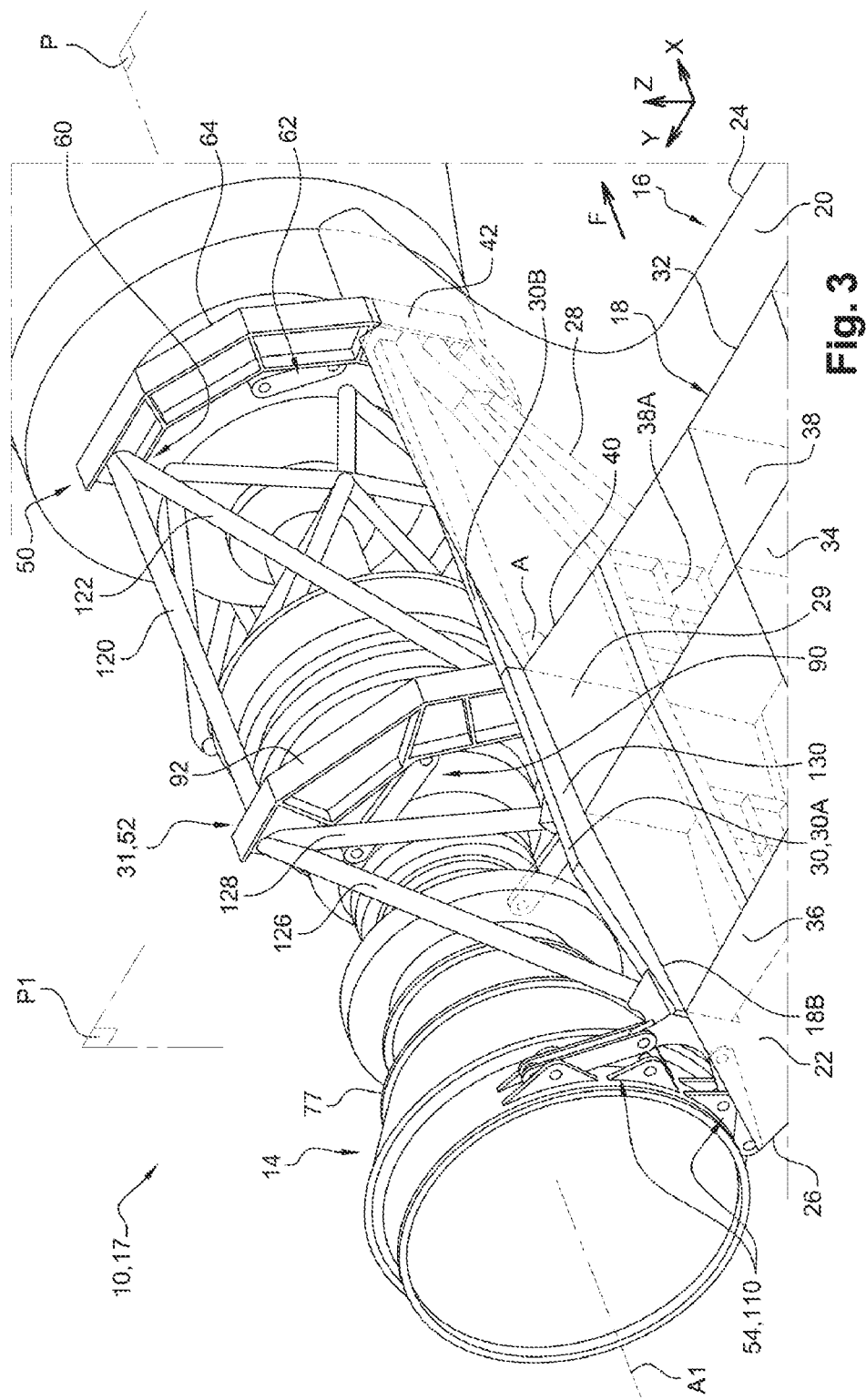
FIG. 3 is a schematic partial perspective view of the assembly for an aircraft of FIG. 1.

FIGS. 2 and 3 show one of the engines 14 and the corresponding attachment pylon 16, on a larger scale.

In a way known per se, the attachment pylon 16 comprises a rigid structure 18 in the form of a box section, namely one made up of an assembly of stringers and of stiffening ribs substantially orthogonal to the stringers. This rigid structure 18 allows an end connected to the aircraft airframe part 12, referred to as the "proximal end 18A" throughout the present description, and an opposite end which is therefore laterally away from the proximal end, and which is termed "distal end 18B."

In addition, the attachment pylon 16 comprises aerodynamic fairings 20, 22 respectively forming a leading edge 24 and a trailing edge 26 of the attachment pylon.

The attachment pylon 16 further comprises a pyramid 28 which extends forward in the continuation of a distal end part 29 of the rigid structure 18.

The attachment pylon 16 finally comprises a component 30 commonly known as the "engine stringer," which extends substantially in the longitudinal direction X and forms the distal end 18B of the rigid structure 18 and a distal face of the pyramid 28. The engine stringer 30 thus forms an interface for connection to attachment means 31 for attaching the engine 14 to the attachment pylon 16, as will become more clearly apparent in what follows.

More specifically, the box-section rigid structure 18 comprises three stringers substantially orthogonal to the longitudinal direction X, namely a front closure stringer 32, also referred to as "first stringer" in the terminology of the invention, an intermediate stringer 34, and a rear closure stringer 36. This rigid structure 18 further comprises stiffening ribs 38, of which one 38A is a reinforced rib, sometimes referred to as "pyramid rib."

As can be seen in FIG. 2, the pyramid 28 at its rear end 40 has an angle A slightly greater than 90 degrees so that the front end 42 of the pyramid is closer to the axis A1 of the engine than the rest of the pyramid. The engine stringer 30 has a corresponding dihedral angle. Thus, a rear part 30A of the engine stringer 30 extends substantially orthogonal to the stringers 32, 34, 36 of the rigid structure 18, whereas a front part 30B of the engine stringer 30 is inclined slightly to follow the overall shape of the pyramid 28.

Figure 4:
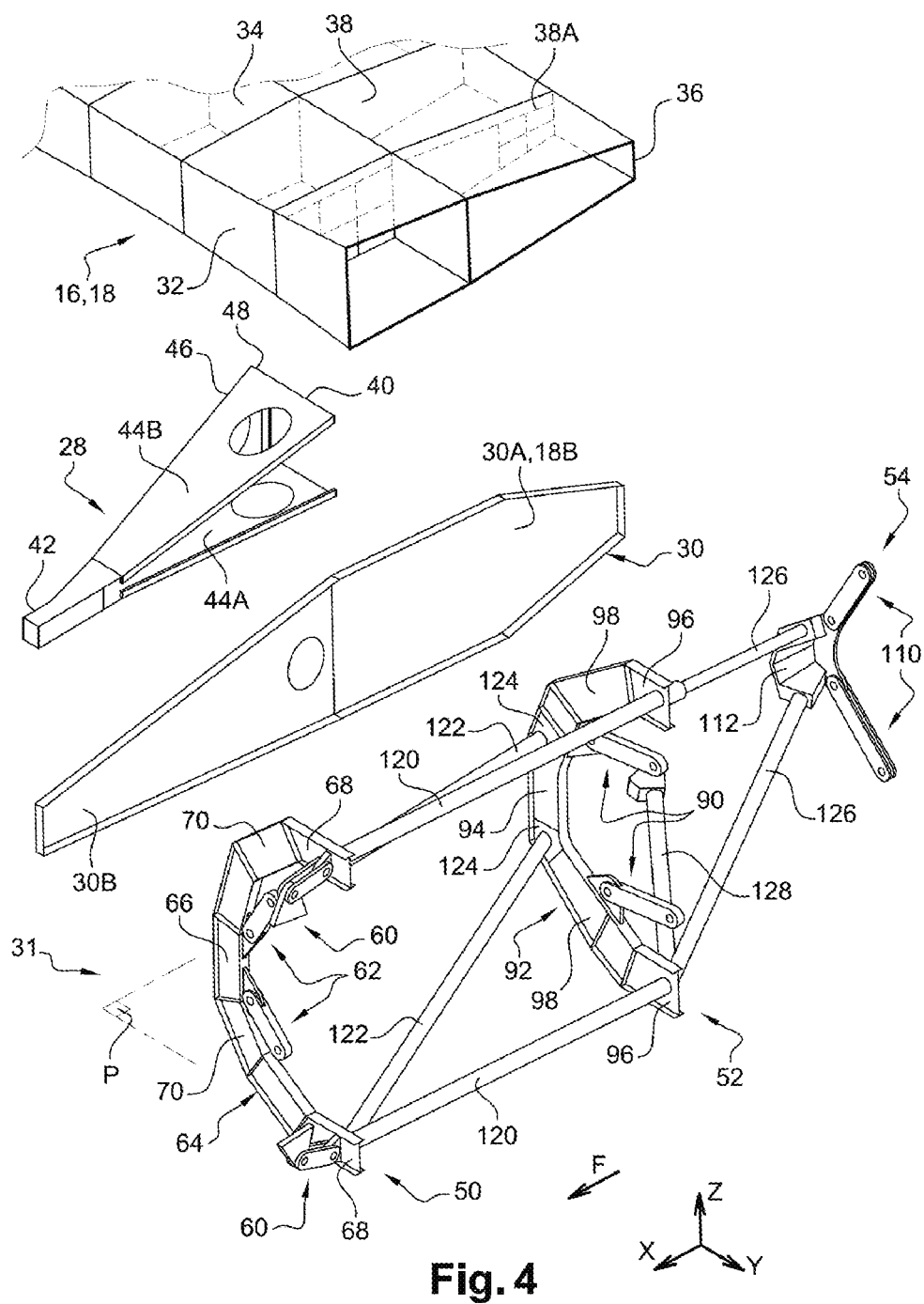
FIG. 4 is a schematic partial exploded perspective view of the assembly for an aircraft of FIG. 1.
Figure 5:
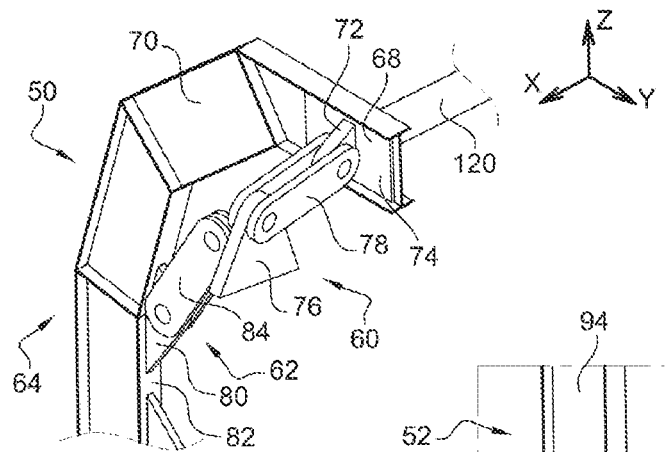
FIGS. 5 to 9 are schematic partial perspective views on a larger scale of the assembly for an aircraft of FIG. 1.

As shown more clearly in FIG. 4, which is an exploded view showing the rigid structure 18, the pyramid 28, the engine stringer 30 and the attachment means 31, the pyramid 28 has, for example, a U-shaped cross section such that the two branches 44A, 44B of the U have respective edges pressing against the engine stringer 30, while the bottom 46 of the U has a rear edge 48 connected to the rigid structure 18, facing the reinforced rib 38A.

FIG. 2 also provides a glimpse of the center of gravity CG of the engine 14, which is shifted considerably forward with respect to the rigid structure 18 because of the requirements regarding the spacing D between the pair of contrarotating rotors 49 of the engine 14 and the leading edge 24 of the attachment pylon. This spacing D needs to be greater than 1 meter and is, for example, equal to approximately 1.3 meters.

The attachment means 31 (FIGS. 3 and 4) are configured to allow the engine 14 to be mounted on the attachment pylon 16 in a statically indeterminate manner and comprise, in general, first attachment means 50 which are shifted forward with respect to the center of gravity CG, second attachment means 52 which are set out to the rear of the first attachment means 50 and extend in a plane P1 of the front closure stringer 32 (FIGS. 2 and 3), and third attachment means 54 arranged to the rear of the second attachment means 52, and a collection of bars for stiffening the attachment means 31 and thus contributing to the transmission of engine load to the rigid structure 18.

These attachment means 31 will now be described in greater detail with reference to FIGS. 2 to 4 which show all of these attachment means and to FIGS. 5 to 9 which illustrate the details thereof.

First of all, the first attachment means 50 comprise two engine attachments 60 for reacting thrust force, which are designed to react the thrust exerted by the engine 14. These two engine attachments are arranged diametrically opposite each other with respect to the axis A1 of the engine 14 and symmetrically with respect to a horizontal plane of symmetry of the engine P, which is a plane parallel to the directions X and Y.

The first attachment means 50 further comprise two first engine attachments 62 for reacting force in the vertical Z and transverse Y directions of the engine 14. These first engine attachments 62 are arranged one on each side of the horizontal plane of symmetry of the engine P.

The first attachment means 50 finally comprise a substantially C-shaped first frame 64 with the concave side facing towards the engine 14 so as to be able to surround part of the engine 14.

This first frame 64 comprises a middle region 66 connected to the front end 42 of the pyramid 28 and to the engine stringer 30. The first frame 64 is thus supported by the pyramid 28. In addition, the first two engine attachments 62 that react forces in the vertical Z and transverse Y directions are connected to this middle region 66.

The first frame 64 further comprises two end regions 68 to which the two engine attachments 60 that react thrust forces are respectively fixed, and two intermediate regions 70 each arranged between the middle region 66 and a corresponding end region 68.

More specifically, the two engine attachments 60 that react thrust forces each comprise a yoke 72 (FIG. 5) formed as a downstream projection on a front face 74 of the first frame 64, and a yoke 76 formed on the carcass 77 of the engine 14, and a connecting rod 78 connecting the yoke 72 to the yoke 76 while being oriented at a relatively shallow angle with respect to the longitudinal direction X, so as to allow effective reaction of thrust forces.

The first two engine attachments 62 that react forces in the vertical Z and transverse Y directions each comprise a yoke 80 formed as a projection from the concave face 82 of the first frame 64, and a connecting rod 84 intended to connect the yoke 80 to a corresponding yoke (not visible in the figures) formed on the carcass 77 of the engine 14. The two connecting rods 84 are inclined with respect to the horizontal plane of symmetry of the engine P, typically by an angle of between 40 degrees and 70 degrees, so as to allow effective reaction of the vertical and transverse forces.

As regards the second attachment means 52, these comprise two engine attachments 90 for reacting moment about the axis A1 of the engine. These two engine attachments 90 are arranged one on each side of the horizontal plane of symmetry of the engine P, preferably symmetrically with respect to this plane P.

In this addition, the second attachment means 52 comprise a substantially C-shaped second frame 92 with the concave side facing towards the engine 14 so as to be able to surround part of the engine 14.

This second frame 92 comprises a middle region 94 connected to the engine stringer 30 while being arranged facing an end of the front closure stringer 32. The second frame 92 is thus borne by the distal end 18B of the rigid structure 18.

The second frame 92 further comprises two end regions 96, and two intermediate regions 98, each one arranged between the middle region 94 and a corresponding end region 96. The two engine attachments 90 for reacting moment about the axis of the engine are respectively fixed to these two intermediate regions 98.

The two engine attachments 90 that react moment about the axis of the engine each comprise a yoke 100 (FIG. 6) formed as a projection from the concave face 102 of the second frame 92, and a connecting rod 104 intended to connect the yoke 100 to a corresponding yoke (not visible in the figures) formed on the carcass 77 of the engine 14. The two connecting rods 104 run substantially parallel to the horizontal plane of symmetry of the engine P, so as to allow effective reaction of the torque applied by the engine 14 about the axis A1 thereof.

Furthermore, the third attachment means 54 comprise two second engine attachments 110 for reacting torque in vertical Z and transverse Y directions of the engine. These two second engine attachments 110 are arranged one on each side of the horizontal plane of symmetry of the engine P. These two second engine attachments 110, for example, comprise a shared mounting plate or end fitting 112 (FIG. 7) and two respective connecting rods 114 intended to connect the mounting plate 112 respectively to two corresponding yokes (not visible in the figures) formed on the carcass 77 of the engine 14. The two connecting rods 114 are inclined with respect to the horizontal plane of symmetry of the engine P, typically by an angle of between 40 degrees and 70 degrees, so as to allow effective reaction of the vertical and transverse forces.

The attachment means 31 further comprise the aforementioned set of bars, which has a symmetric configuration with respect to the horizontal plane of symmetry of the engine P.

This set comprises two first bars 120 (FIG. 4) respectively connecting two first regions of the first frame 64, namely the two end regions 68 of the first frame 64, to two second regions of the second frame 92, namely the two end regions 96 of the second frame 92.

Figure 6:
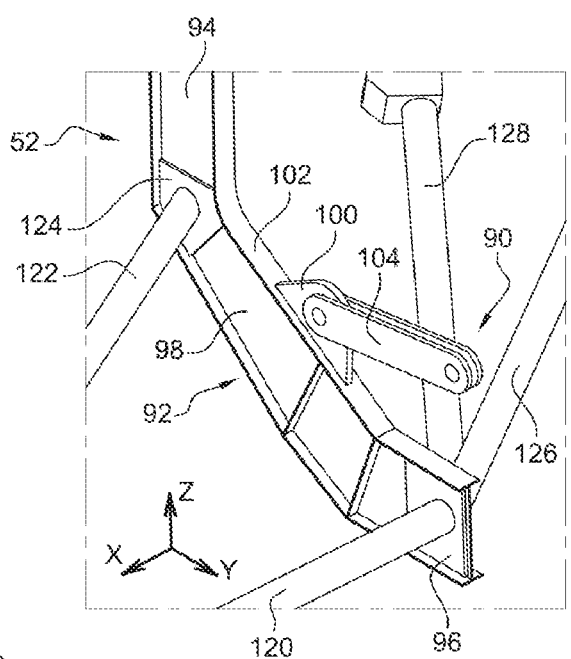
Figure 7:
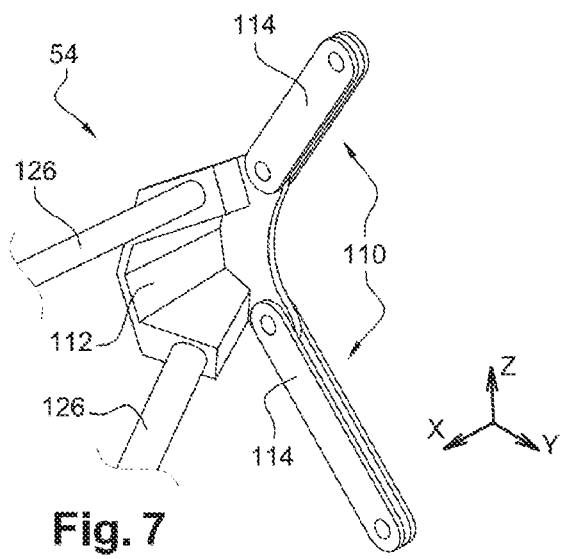

The collection of bars further comprises two second bars 122 respectively connecting the two first regions or end regions 68 of the first frame 64 to two third regions 124 of the second frame 92 which are arranged between the two second regions 96 of this second frame 92, in a continuation of the front closure stringer 32 (FIGS. 4 and 6). The aforementioned two second regions 96 are formed at the circumferential ends of the middle region 94 of the second frame 92.

The set of bars also comprises two third bars 126 respectively connecting the two second regions 96 of the second frame 92 to the third attachment means 54, in this instance to the mounting plate 112 shared by the two second engine attachments 110 (FIG. 4).

The set of bars finally comprises two fourth bars 128 respectively connecting the two second regions 96 of the second frame 92 to a region 130 of the engine stringer 30 (and therefore of the distal end 18B of the rigid structure 18) which is positioned substantially in the continuation of the intermediate stringer 34 (FIG. 3).

Figure 8:
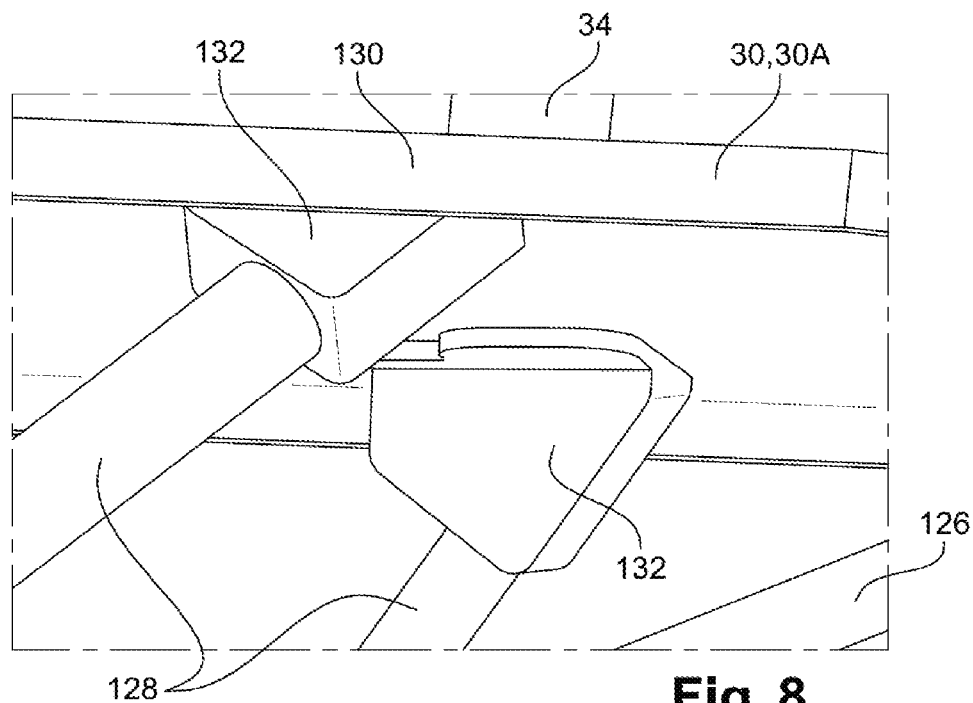

FIG. 8 illustrated the connection of the two fourth bars 128 to the region 130 of the engine stringer 30 by means of two respective end fittings 132 of triangular overall cross section.

Figure 9:
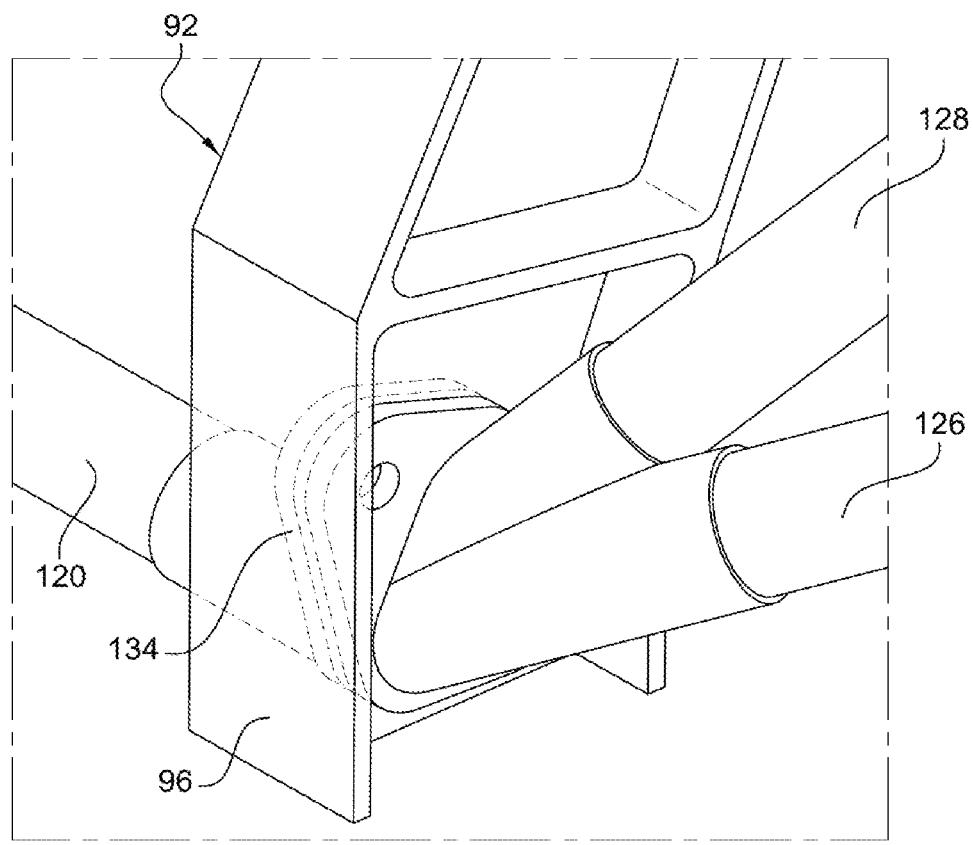

FIG. 9 illustrates the connection of one of the first bars 120 to the corresponding third bar 126 and the corresponding fourth bar 128 by means of an end fitting 134 which is fixed to the corresponding second region 96 of the second frame 92.

During operation, the attachment means 31 described hereinabove allow effective transmission of static and dynamic forces from the engine 14 to the attachment pylon 16.

In particular, the moment about the axis A1 of the engine is reacted effectively by the two engine attachments 90, notably because of the fact that these are connected to a relatively thick part of the rigid structure 18 of the attachment pylon 16, in this instance in the continuation of the front closure stringer 32. The latter is, for this reason, referred to in the terminology of the invention as the "first stringer."

As an alternative, the two engine attachments 90 that react the moment about the axis A1 of the engine may be arranged facing another stringer of the rigid structure 18, for example facing the intermediate stringer 34. The latter may therefore, as an alternative, constitute the "first stringer" within the meaning of the invention.

Arranging the two engine attachments 90 facing the rigid structure 18, in particular, makes it possible to limit the torque imposed on the pyramid 28 and therefore lighten the structure of this pyramid.

Figure 10:
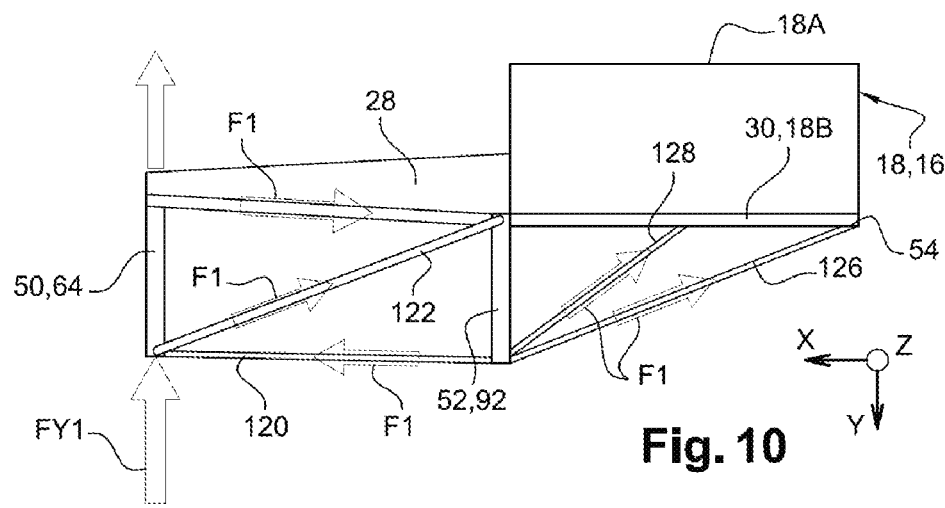
FIGS. 10 and 11 are schematic partial views from above of the assembly for an aircraft of FIG. 1, respectively illustrating how the lateral and longitudinal loads are reacted by the pylon of this assembly.
Figure 11:
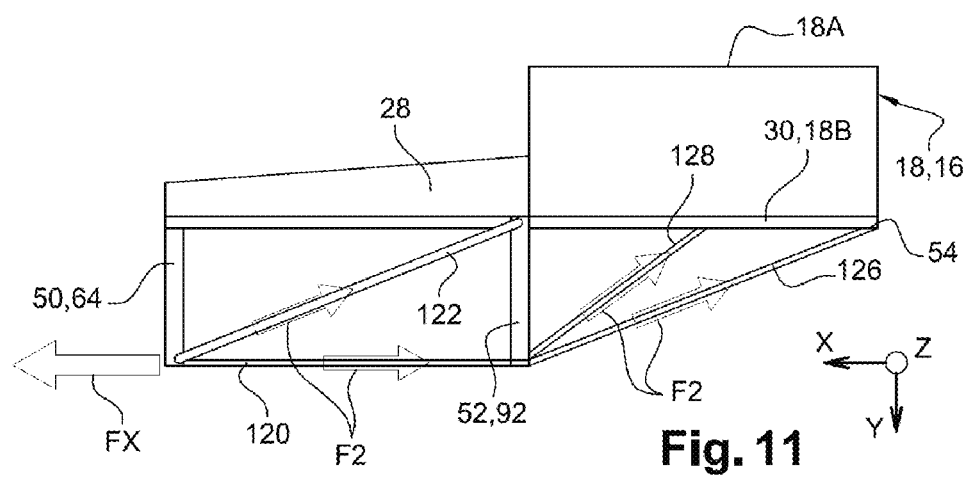

FIGS. 10 and 11, in particular, illustrate the path of forces F1 and F2, respectively, within the attachment means 31 in the case of the application of a lateral force FY1 in the plane of the first frame 64, namely a force oriented in the transverse direction Y, and, in the case of the application of a thrust force FX, oriented in the longitudinal direction X, respectively.

Figure 12:
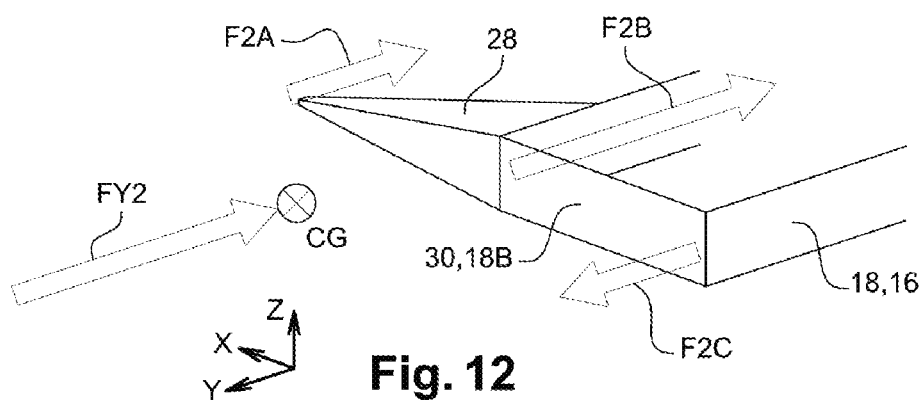
FIG. 12 is a schematic partial perspective view of the assembly for an aircraft of FIG. 1, illustrating how the lateral loads are reacted by the pylon of this assembly.

FIG. 12 illustrates the forces F2A, F2B, F2C transmitted to the attachment pylon 16 in the case of a lateral force FY2 of 100,000 Newtons applied to the center of gravity CG of the engine. These transmitted forces are split into a very predominant component F2B (around 99,400 N) in a forward part of the rigid structure 18, and two minority components F2A, F2C (of around 32,000 N each), applied respectively to the front end of the pyramid 28 and to a rear part of the rigid structure 18, and in opposite respective directions. These two minority components F2A, F2C are the result of the torque in the vertical direction induced by the shifted forward position of the center of gravity CG of the engine. The forces are thus transmitted relatively directly in the rigid structure 18.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft, comprising:
   a part of an aircraft airframe,
   an engine comprising a gas generator and a receiver with a pair of contrarotating unducted rotors positioned forward of the gas generator and centered along an axis of the engine,
   an attachment pylon comprising a rigid structure in the form of a box section which has a proximal end connected to the aircraft airframe part and a distal end laterally separated from the proximal end,
   attachment means for attaching the engine to the attachment pylon,
   in which:
   the rigid structure comprises a rear closure stringer and a first stringer set out forward of the rear closure stringer,
   the engine has a center of gravity shifted forward with respect to the rigid structure,
   the attachment means comprise first attachment means shifted forward with respect to the center of gravity, second attachment means laid out to the rear with respect to the first attachment means and extending in a plane of the first stringer, and third attachment means laid out to the rear with respect to the second attachment means,
   the attachment pylon comprises a pyramid connecting the first attachment means to the rigid structure, and
   the second attachment means comprise two engine attachments, which are positioned one on each side of a horizontal plane of symmetry of the engine.

2. An assembly for an aircraft according to claim 1, in which the first attachment means comprise a first frame borne by the pyramid and bearing each engine attachment of the first attachment means.

3. An assembly for an aircraft according to claim 1, in which the first attachment means comprise two engine attachments for reacting thrust forces which are laid out diametrically opposite one another about the axis of the engine and symmetrically with respect to the horizontal plane of symmetry of the engine.

4. The assembly for an aircraft according to claim 1, in which the second attachment means comprise a second frame borne by the distal end of the rigid structure and bearing the two engine attachments for reacting moment about the axis of the engine.

5. An assembly for an aircraft according to claim 2, in which the first attachment means comprise two first engine attachments for reacting forces in vertical and transverse directions of the engine, these being arranged one on each side of the horizontal plane of symmetry of the engine.

6. The assembly for an aircraft according to the combination of claim 2, in which the attachment means comprise two first bars respectively connecting two first regions of the first frame, to which the two engine attachments that react thrust forces are respectively connected, to two second regions of the second frame.

7. The assembly for an aircraft according to claim 6, in which the attachment means comprise two second bars respectively connecting the two first regions to two third regions of the second frame and arranged between the two second regions in a continuation of the first stringer.

8. The assembly for an aircraft according to claim 7, in which the attachment means comprise two third bars respectively connecting the two second regions of the second frame to the third attachment means.

9. The assembly for an aircraft according to claim 8, in which the rigid structure comprises an intermediate stringer arranged between the rear closure stringer and the first stringer, and in which the attachment means comprise two fourth bars respectively connecting the two second regions of the second frame to a region of the distal end of the rigid structure arranged in the continuation of the intermediate stringer.

10. An assembly for an aircraft, comprising:

a part of an aircraft airframe;

an engine comprising a gas generator and a receiver with a pair of contrarotating unducted rotors positioned forward of the gas generator and centered along an axis of the engine;

an attachment pylon comprising a rigid structure in the form of a box section which has a proximal end connected to the aircraft airframe part and a distal end laterally separated from the proximal end;

attachment means for attaching the engine to the attachment pylon, in which:

the rigid structure comprises a rear closure stringer and a first stringer set out forward of the rear closure stringer;

the engine has a center of gravity shifted forward with respect to the rigid structure;

the attachment means comprise first attachment means shifted forward with respect to the center of gravity, second attachment means laid out to the rear with respect to the first attachment means and extending in a plane of the first stringer, and third attachment means laid out to the rear with respect to the second attachment means; and the second attachment means comprise two engine attachments, which are positioned one on each side of a horizontal plane of symmetry of the engine, wherein the third attachment means comprise two second engine attachments arranged one on each side of the horizontal plane of symmetry of the engine.

11. An assembly for an aircraft according to claim 1, wherein the second attachment means and the third attachment means are laid out to the rear with respect to the center of gravity.

* * * * *